Figure 1:
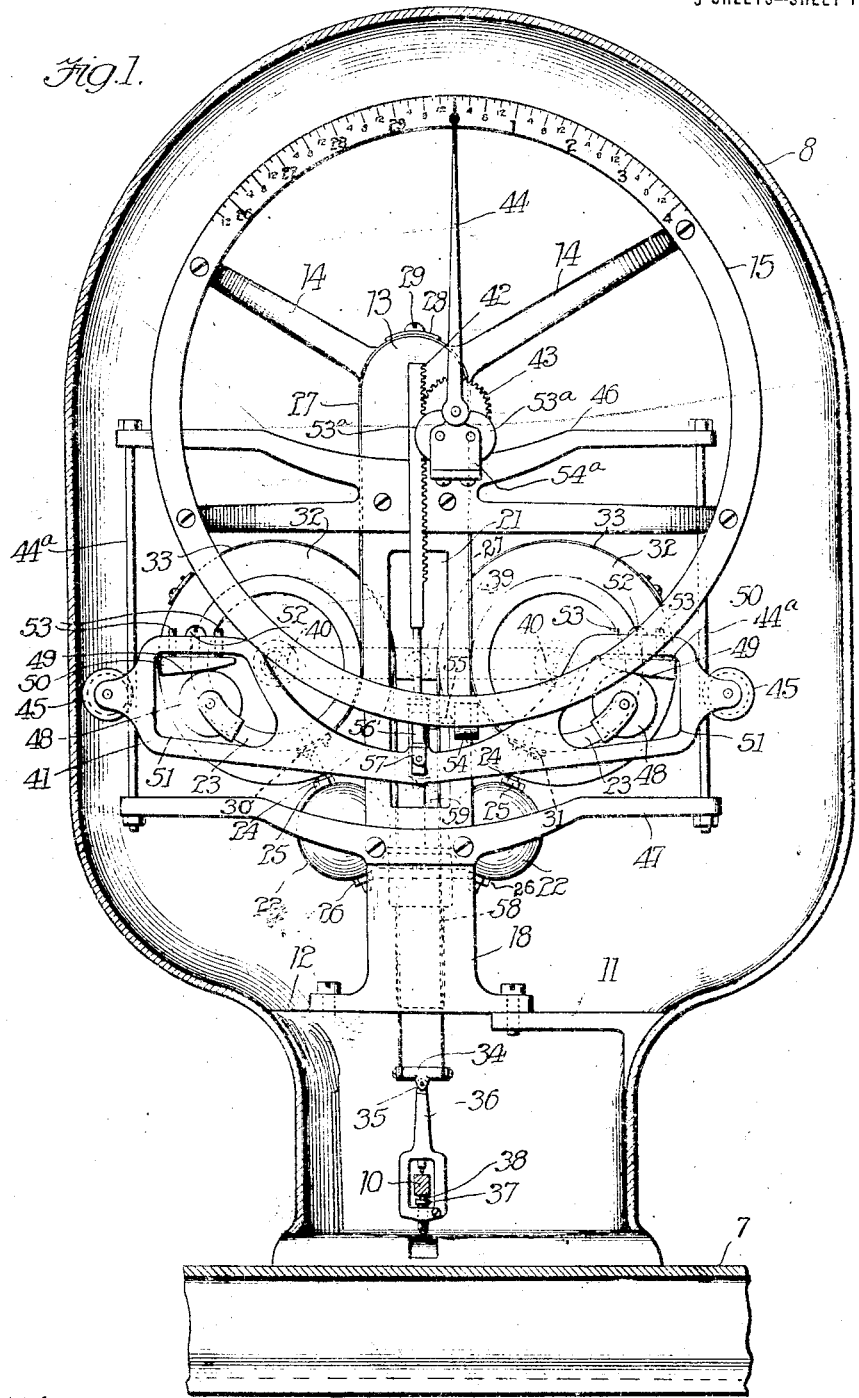

L. C. WETZEL.
WEIGHING SCALE.
APPLICATION FILED JAN. 15, 1912.

1,205,691.

Patented Nov. 21, 1916.
3 SHEETS—SHEET 1.

Witnesses
Martin H. Olsen
Robert Dobberman

Inventor
Lewis C. Wetzel
By Rector Hibben Davis Macaulay
Attys.

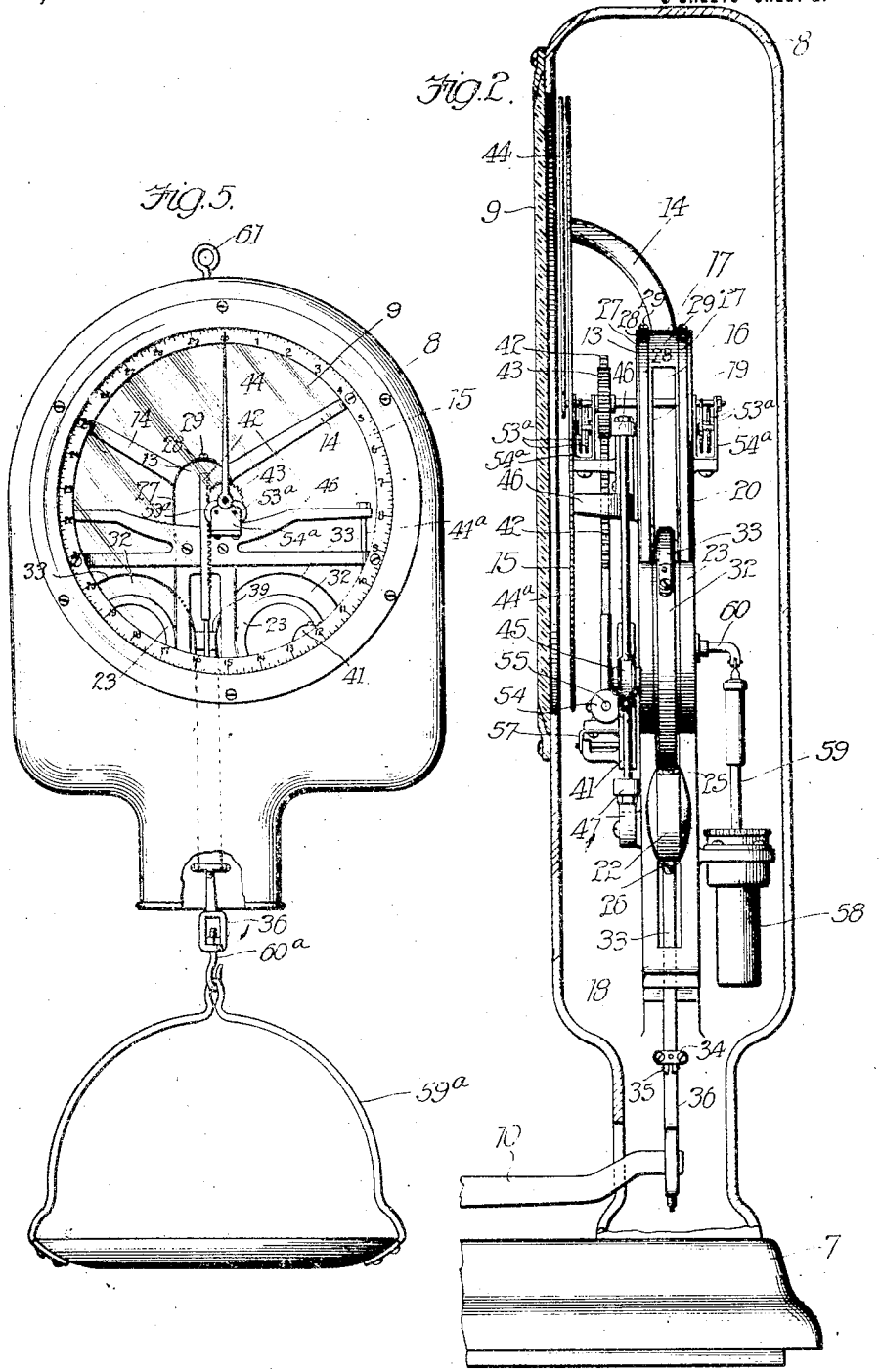

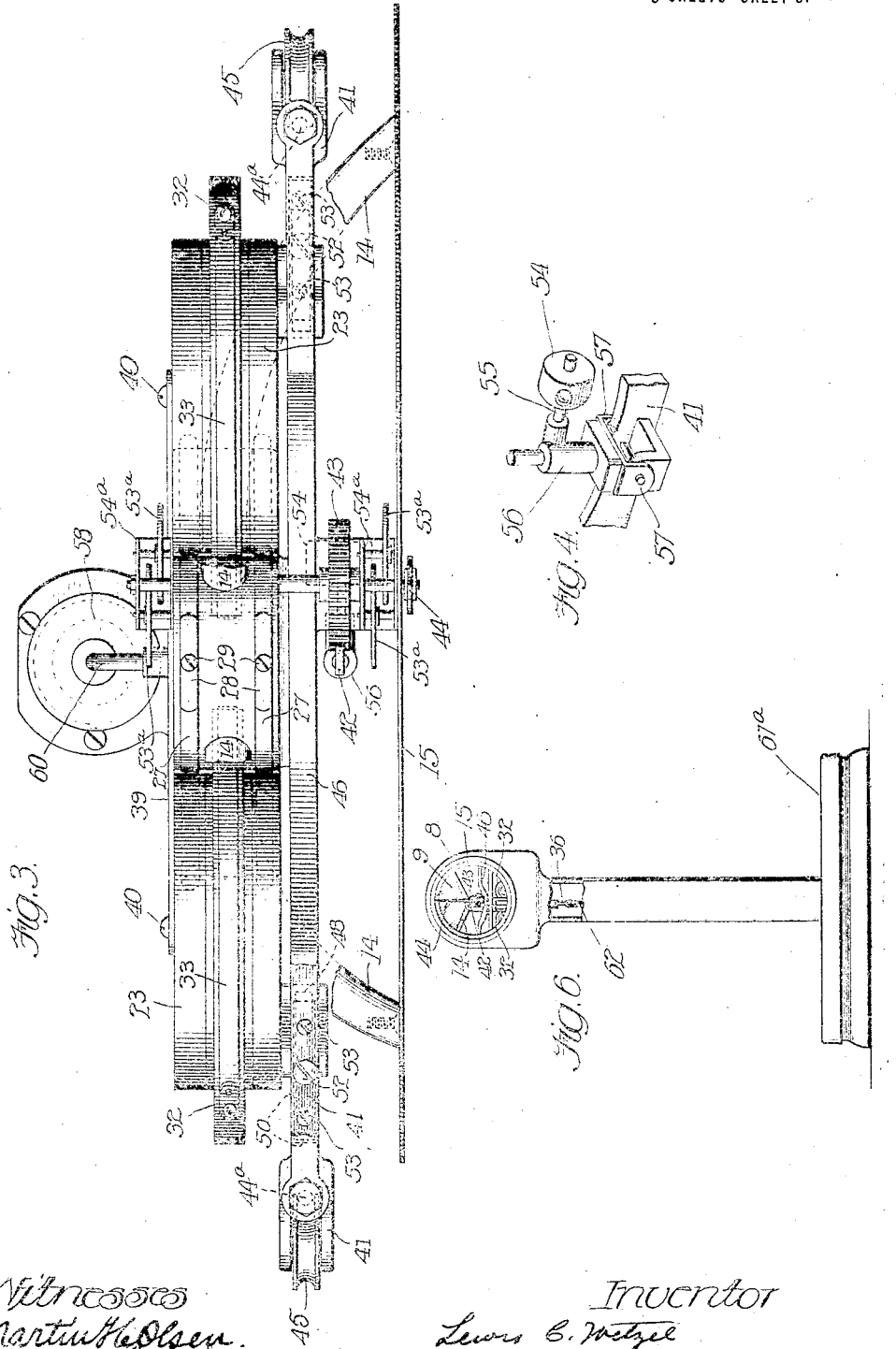

UNITED STATES PATENT OFFICE.

LEWIS CALVIN WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,205,691.  Specification of Letters Patent.  Patented Nov. 21, 1916.

Application filed January 15, 1912. Serial No. 671,147.

*To all whom it may concern:*

Be it known that I, LEWIS C. WETZEL, a citizen of the United States, residing at Toledo, in the county of Lucas and State of Ohio, have invented certain new and useful Improvements in Weighing-Scales, of which the following is a specification.

My invention relates to the means for counterbalancing the commodity placed in the scale pan or receptacle and accurately indicating the weight thereof, and more especially to pendulum scales in which the weight of the commodity is automatically counterbalanced by the displacement of a pendulum with reference to the vertical. In some scales of this character the distribution of weight and arrangement of parts is such that the pendulum in restoring equilibrium after the addition of the commodity to be weighed to the scale pan, is displaced from the perpendicular and swings toward the horizontal. In other scales of this character the pendulum is in a raised position normally with the scale pan empty and the scale in equilibrium, and is displaced or swings toward the perpendicular position when a weight is placed in the scale pan in order to restore equilibrium. Whichever of these forms of pendulum scales be in question a certain adjustment or position of the structure as a whole with reference to the vertical is necessary in order that the indicator may point to zero when the scale is in equilibrium with the commodity receptacle empty and weigh correctly any commodity placed in the pan. In order to avoid this necessity of careful adjustment it has been proposed to substitute for the usual single pendulum counterbalance member a pair of pendulum counterbalance members the arrangement and connection of which is such that the displacement of one from the normal zero position by reason of an inclination of the structure as a whole from the vertical and its aberration in weighing commodities placed in the pan are offset by the displacement and aberration of the other pendulum and the connection to the indicator is such that it receives its movement from both pendulums and the reading represents a mean of the displacements of the two and therefore is substantially correct.

My invention is in the nature of an improvement or improvements upon scales of this double pendulum type although certain features thereof are applicable to other types of scales and counterbalance mechanism not necessarily involving a double counterbalance or a pendulum. In the accompanying drawings however, I have shown my invention embodied in a counterbalancing mechanism of the double pendulum form and applied to several different types of scales which are found in common use and in the specification below I have described the several forms shown in detail. But it will be apparent from the following claims in which I have set forth my invention, that many modifications may be made in the scales differing from the constructions specifically set out without departing from the spirit and scope of my invention.

In the drawings Figure 1 is an elevation of my invention as applied to a beam scale, the casing in which the mechanism is inclosed, however, the beam and the support or platform being shown in cross section; Fig. 2 is a side elevation of the same with the casing again shown in section to permit a view of the interior thereof and only so much of the beam and platform being shown as is necessary to understand the operation of my invention; Fig. 3 is a plan view of the same construction but on an enlarged scale and without the casing; Fig. 4 is a perspective of a fragmentary detail to be described later; Figs. 5 and 6 are elevations illustrating the application of my invention to other forms of scales.

Referring now to Figs. 1, 2, 3 and 4, the base of the scale is shown at 7 and supports at one end a housing 8 which contains the counterbalancing mechanism and indicator a pane or window 9 being provided for the inspection of the latter. The end 10 of the scale beam which may be of any well known or suitable type is shown as connected to the counterbalancing mechanism, it being understood, however, that since the pendulums in the particular construction shown rise in response to a downward pull upon the connection to the beam, the type of lever or beam and distribution of weight must be such that the addition of commodity to be weighed to the scale pan or receptacle causes a depression of this end of the beam. In case the scale is to weigh with falling pendulum the construction of the counterbalance means would remain the same but the connections to the indicator and the lever and weight distribution would be altered. Upon brackets 11, 12 within the housing 8 is mounted an upright supporting member or frame 13 having arms 14, 14 at its upper end to assist in supporting the dial 15. The upright is hollow throughout and provided with a slot or transverse opening 16 extending substantially the length thereof but terminating just short of the ends to leave connecting portions 17, 18 at the top and bottom thereof respectively, see Fig. 2. The front and back slabs 19, 20 formed by slotting the support are cut out at 21 to form registering rectangular openings extending lengthwise of the support. Within and through the openings so formed in the central support certain of the movable parts of the operating mechanism reciprocate and are guided. Upon the opposite edges of the support are arranged to rock the counterbalance members each of which includes a pendulum 22 and a rocking drum or roller 23 to which the pendulum weight is attached by a rod 24 with reference to which the weight is adjustable by nuts 25, 26. The drums or rollers are so suspended from the support by means of a pair of ribbons or straps 27, 27 each of which is secured intermediate its length to the curved upper end of the support by a plate 28 and screw 29. The ribbons are arranged respectively in opposite sides of the transverse slot in the support and the opposite ends of each ribbon lie upon the opposite edges of the support, the corresponding ends of both ribbons being secured to the periphery of the drum upon the same side of the support as at 30, 31 (see dotted lines in Fig. 1). The ribbons form the sole supports for the drums. Intermediate its ends each drum or roller is provided with a peripheral flange or rib 32, 32 which is of a width to project freely into the transverse slot or opening 16 in the support and upon the curved periphery of each flange is secured the upper end of a ribbon 33 which lies upon the curved surface thereof and extends into the transverse slot and downwardly through the support. The lower ends of the ribbons are attached to an equalizer bar 34 which in turn is pivoted as at 35 to the upper end of a stirrup 36 which carries the usual cup 37 to engage a cone 38 upon the scale beam 10 before mentioned. The drums or rollers are loosely connected at the rear by a transverse bar 39 which is pivoted at its opposite ends by means of screws 40, 40 (see Fig. 3) to the centers of the drums.

It will be obvious from the construction so far described that when the end 10 of the beam is depressed by the imposition of weight upon the scale pan or receptacle it will exert a pull upon the ribbons 33, 33 which will cause the drums 23 to roll or rock upward upon the central support and the straps 27. It will be observed that the real centers of suspension and oscillation of the pendulum are not in the center of the central support as the rollers rock or roll upward. The combined effect of the upward motion of the rollers and their movement of rotation is communicated to a vertically movable frame 41 to the center of which is connected a rack 42 meshing with a pinion 43 which turns the dial index 44. Motion is communicated from the rollers to the vertically movable frame by antifriction disks 48 mounted upon the front faces of the rollers at their peripheries and operating upon transverse bearing surfaces 49, 49 carried by the frame. The frame 41 is guided in its vertical movement by guides 44ª, 44ª with which the grooved rollers 45, 45 on the ends of the frame engage and the guides are supported at their upper and lower ends upon cross pieces 46, 47 secured to the central upright 13. The upper cross piece also forms a support for the dial. The frame 41 is formed at its opposite ends with transverse openings 51, 51 within which the antifriction disks reciprocate as they raise and lower the frame.

In order to correct for the unequal movement of the pendulums and of the antifriction disks 48 under equal additions or increments of weight to the scale pan, the bearing surfaces on the vertically movable frame with which these disks coöperate are suitably cammed and preferably they are formed upon blocks 50, 50 secured within openings 51, 51 in the frame by means of screws 52, 52. Adjusting screws 53, 53 bear upon opposite ends of these cammed blocks for the purpose of securing accurate adjustment and rigidity. By suitably shaping the faces of these blocks they so correct for the irregularity of the movement of the disks 48, 48 that each equal increment of weight placed upon the scale pan will cause an equal upward movement of the frame and consequently an equal movement of the dial finger; hence the weight marks and indications upon the chart can be evenly spaced. The journal or shaft of the dial hand and pinion will rest upon antifriction disks 53ª, 53ª which are journaled upon the brackets 54ª secured upon the vertical support. In order that the vertical rack 42 may be maintained in engagement with the pinion 43 and yet be permitted sufficient movement to avoid binding, it is provided with a weight 54 adjustably mounted upon a rod 55 projecting on the toothed side of the rack from a collar 56 which receives the lower end of the rack bar and is pivoted to the vertically movable frames by means of downwardly projecting ears 57, 57 perforated and pivoted to said frame (see Fig. 4). Violent movement of the parts is prevented from being transmitted to the vertically moving frame by a dash-pot 58 mounted upon the stationary support or upright and the piston of which is connected by its rod 59 to an arm or bracket 60 secured to such frame.

The operation of the scale will now be readily understood. When the end 10 of the beam is depressed by the addition of weight to the scale pan it draws down the ribbons 33 which rotate the rolls or drums 23 causing them to move upward upon their ribbons 27 and the central upright. The antifriction disks 48, 48 acting upon the bearing surfaces 49, 49 raise the vertical frame a distance proportional to the weight in the pan and the frame by means of the rack 42 operates the dial pointer. The pendulums in their outward and upward movement exert a constantly increasing resistance to further movement and if the weight of the commodity in the pan is within the capacity of the scale, equilibrium is finally restored and the weight may then be read upon the dial. If the scale be tilted the displacement of that pendulum which is upon the lower side will be increased over the normal by an amount which is exactly offset by the decrease from the normal in the displacement of the pendulum on the upper side. The rollers, however, are rocked to unequal extents by the pendulums and the frame 41 will therefore be somewhat tilted, but the grooved rollers 45 are so mounted as to permit this tilting without binding upon the guides. Likewise the equalizer bar 34 will be slightly tilted to permit the unequal movement of the ribbons. If the index finger does not point to zero when the scale is in equilibrium with the pan empty for any reason, as for example by reason of the stretching of the ribbons 27, the reading may be corrected by adjusting the bearing blocks 50 by the screws heretofore mentioned.

Fig. 5 shows the device as applied to a hanging scale. The interior construction is precisely like that heretofore described but the scale pan 59' is hung directly to the stirrup 36 by means of a hook 60ᵃ and an eye 61 provided for suspending the device from any suitable support. Fig. 6 illustrates the application of the counterbalancing means to the ordinary scale for weighing larger and heavier commodities. The platform 61ᵃ and the lever systems may be of the usual type and are not illustrated but the usual link 62 is suspended from the stirrup 36 of the counterbalance mechanism as is the scale pan in the modification shown in Fig. 5 and the beam arm in the modification shown in Figs. 1, 2 and 3.

I claim:

1. In a weighing scale, a stationary support, a commodity receptacle, a pair of counterbalance members each comprising a pendulum, connections from said counterbalance members to said commodity receptacle, a vertically movable frame, connections from said frame to the counterbalance members at corresponding points of the latter removed from their axes and independent of the connection from the counterbalance members to the commodity receptacle, and indicating means connected to the frame for operation thereby.

2. In a weighing scale, a stationary support, a commodity receptacle, a pair of counterbalance members each comprising a pendulum, connections from said counterbalance members to the commodity receptacle, a frame connected to the counterbalance members at corresponding points removed from the axes of the latter and independent of the connection to the commodity receptacle, and indicating means connected to a point on the frame intermediate the counterbalance members for operation thereby.

3. In a weighing scale, a stationary support, a commodity receptacle, a pair of counterbalance members each comprising a pendulum, connections from said counterbalance members to said commodity receptacle, a vertically movable frame, vertical guides for said frame, connections from said frame to the counterbalance members at corresponding points of the latter removed from their axes and independent of the connection from the counterbalance members to the commodity receptacle, and indicating means connected to the frame for operation thereby.

4. In a weighing scale, a stationary support, a commodity receptacle, a pair of counterbalance members comprising pendulums, abutments rigidly connected to the pendulums at points eccentric to the axes thereof, a vertically movable frame supported by said abutments, an indicator and connections from the vertical frame for operating the same.

5. In a weighing scale, a stationary support, a commodity receptacle, a counterbalance member connected to the commodity receptacle and comprising a pendulum and an oscillating support therefor, a vertically movable frame having a cammed bearing surface thereon, an abutment on the counterbalance member eccentric to its center of oscillation coöperating with the cammed bearing surface to move the frame, indicating mechanism, and connections between the same and the vertically movable frame.

6. In a weighing scale, a stationary support, a commodity receptacle, a counterbalance member connected to the commodity receptacle and comprising a pendulum and a vertically rocking support therefor, a vertically movable frame having a cammed bearing surface thereon, an abutment on the counterbalance member eccentric to its center of oscillation coöperating with the eccentric bearing surface to move the frame, indicating mechanism, and connections between the same and the vertically movable frame.

7. In a weighing scale, a stationary support, a commodity receptacle, a counterbalance member connected to the latter comprising a vertically rocking support, a ribbon connecting the stationary support and the vertically rocking support, a vertically movable frame having cammed bearing surface, an abutment on the counterbalance member eccentric to its center of oscillation coöperating with the bearing surface to raise and lower the frame, indicating mechanism and connections between the same and the frame.

8. In a weighing scale, a stationary support, a commodity receptacle, a counterbalance member connected to the commodity receptacle and comprising a pendulum and an oscillating support therefor, a vertically movable frame having an adjustable cammed bearing surface thereon, an abutment on the counterbalance member eccentric to its center of oscillation coöperating with the eccentric bearing surface to move the frame, indicating mechanism, and connections between the same and the vertically movable frame.

9. In a weighing scale, a stationary support, a commodity receptacle, a counterbalance member connected to the commodity receptacle and comprising a pendulum and an oscillating support therefor, a vertically movable frame having cammed bearing surface thereon, an anti-friction roller on the counterbalance member eccentric to its center of oscillation coöperating with the cammed bearing surface to move the frame, indicating mechanism, and connections between the same and the vertically movable frame.

10. In a weighing scale, a stationary support, a commodity receptacle, a counterbalance member including a pendulum and a rocker, a ribbon connected to the support and secured to the arc of the rocker for supporting the latter, a ribbon also secured to the periphery of the rocker and extending thereover and connected to the commodity receptacle, a vertically movable frame having a transverse bearing surface, an abutment on the counterbalance member eccentric to its center of oscillation coöperating with the bearing surface, an indicator, and operating connections between the same and the vertically movable frame.

11. In a weighing scale and in combination with the stationary support and commodity receptacle thereof, a pair of counterbalance members each comprising a pendulum and an abutment, a vertically movable frame having a pair of similar cam surfaces with which said abutments coöperate, an indicator and means connected to the frame for operating the latter.

12. In a weighing scale, a stationary support, a commodity receptacle, a pair of counterbalance members connected thereto, each comprising an oscillating member, a frame provided with a pair of transverse bearing surfaces, abutments on the counterbalance members eccentric to their centers of oscillation coöperating with the bearing surface to move the frame, an indicator, and operating connections between the frame and the indicator.

13. In a weighing scale, a stationary support, a commodity receptacle, a pair of counterbalance members connected thereto, each comprising a pendulum and a member arranged and connected to rock in a vertical frame, a vertically movable plane having transverse bearing surfaces thereon, abutments on the counterbalance members eccentric to their centers of oscillation coöperating with said bearing surfaces to move the frame, an indicating mechanism, and connections from the frame thereto for operating the same.

14. In a weighing scale, a stationary support, a commodity receptacle, a pair of counterbalance members connected thereto, each comprising a pendulum and a rocker, ribbons attached at their lower ends to the peripheries of the rockers and suspending the latter from the stationary support, a vertically movable frame having transverse bearing surfaces, abutments upon the rockers eccentric to their centers of oscillation adapted to coöperate with the bearing surfaces to raise and lower the frame, indicating mechanism, and connections from the frame thereto for operating the same.

15. In a weighing scale, a stationary support, a commodity receptacle, a pair of counterbalance members connected thereto, each comprising a pendulum and a rocker, ribbons attached at their lower ends to the peripheries of the rockers and suspending the latter from the stationary support, a vertically movable frame having transverse bearing surfaces, anti-friction disks upon the rockers eccentric to their centers of oscillation adapted to coöperate with the bearing surfaces to raise and lower the frame, indicating mechanism, and connections from the frame thereto for operating the same.

16. In a weighing scale, a stationary support, a commodity receptacle, a pair of counterbalance members, each comprising a pendulum and a drum connected to the support to rock in a vertical plane, ribbons connected to the peripheries of the drums, means connecting the ribbons to the commodity receptacle, a vertically movable frame having transverse bearing surfaces, abutments on the drums eccentric to their centers of oscillation arranged to coöperate with the bearing surfaces to raise the frame, indicating mechanism, and connections from the frame thereto for operating the same.

17. In a weighing scale, a stationary support, a commodity receptacle, a pair of counterbalance members connected thereto, each comprising a pendulum and an oscillating support therefor, a frame having cammed transverse bearing surfaces, abutments upon the counterbalance members eccentric to their centers of oscillation coöperating with the bearing surfaces to raise and lower the frame, indicating mechanism, and connections from the frame thereto for operating the same.

18. In a weighing scale, a stationary support, a commodity receptacle, a pair of counterbalance members connected thereto, each comprising a pendulum and an oscillating support therefor, a frame having vertically adjustable cammed transverse bearing surfaces, abutments upon the counterbalance members eccentric to their centers of oscillation coöperating with the bearing surfaces to raise and lower the frame, indicating mechanism, and connections from the frame thereto for operating the same.

19. A counterbalance and indicating mechanism for weighing scales, comprising indicating means, a vertically movable frame connected to the indicating means for operating the same, transverse bearing surfaces upon the frame, counterbalance members each comprising a pendulum and a drum and having anti-friction disks eccentric to their centers of oscillation coöperating with the bearing surfaces for raising and lowering the vertically movable frame, ribbons attached to the stationary support and to the peripheries of the drums for supporting the latter, and ribbons attached at their upper ends to the peripheries of the drums and at their lower ends to means adapted to be connected to a weight receptacle.

20. In a counterbalancing and indicating mechanism for weighing scales, a stationary support having a central transverse slot, a pair of drums arranged on opposite sides of the support having central annular ribs extending into the transverse slot in the support, ribbons attached to the support and to the peripheries of the drums for supporting the latter, ribbons secured at their upper ends to the annular ribs and adapted at their lower ends to be connected to a commodity receptacle, pendulums rigidly connected to the drums, anti-friction rollers correspondingly located upon the faces of the drums, a vertically reciprocating frame having bearing surfaces with which the anti-friction disks coöperate to raise and lower the frame, a guide frame, rollers upon the vertically movable frame coöperating with the guide frame, indicating mechanism, and means connecting the vertically moving frame therewith for operating the same.

LEWIS CALVIN WETZEL.

Witnesses:
L. D. BAKER,
H. S. BERGEN.